US009321059B2

(12) United States Patent
Zhou et al.

(10) Patent No.: US 9,321,059 B2
(45) Date of Patent: Apr. 26, 2016

(54) BALL ARM SWITCHING SHOWER

(75) Inventors: Huasong Zhou, Xiamen (CN); Shuiyuan Luo, Xiamen (CN); Cailin Wu, Xiamen (CN); Bin Cao, Xiamen (CN)

(73) Assignees: XIAMEN SOLEX HIGH-TECH INDUSTRIES CO., LTD., Xiamen, P. R. (CN); Huasong ZHOU, Xiamen, P. R. (CN)

( * ) Notice: Subject to any disclaimer, the term of this patent is extended or adjusted under 35 U.S.C. 154(b) by 728 days.

(21) Appl. No.: 13/641,563

(22) PCT Filed: Apr. 28, 2011

(86) PCT No.: PCT/CN2011/073431
§ 371 (c)(1), (2), (4) Date: Oct. 16, 2012

(87) PCT Pub. No.: WO2011/134407
PCT Pub. Date: Nov. 3, 2011

(65) Prior Publication Data

US 2013/0032645 A1 Feb. 7, 2013

(30) Foreign Application Priority Data

Apr. 30, 2010 (CN) .......................... 2010 1 0161239
Apr. 30, 2010 (CN) ...................... 2010 2 0176857 U

(51) Int. Cl.
*F16K 11/078* (2006.01)
*F16K 11/07* (2006.01)
(Continued)

(52) U.S. Cl.
CPC . *B05B 1/18* (2013.01); *B05B 1/169* (2013.01); *B05B 1/1609* (2013.01); *Y10T 137/86549* (2015.04)

(58) Field of Classification Search
CPC ........ B05B 1/1609; B05B 1/169; B05B 1/18; Y10T 137/86549
USPC ......... 239/443–449, 559, 560, 562, 563, 567; 137/616.3, 625.17, 625.42, 636.4, 137/637.4, 801; 251/96, 297, 56, 215, 229
See application file for complete search history.

(56) References Cited

U.S. PATENT DOCUMENTS 4,796,666 A * 1/1989 Bergmann ............... 137/625.17
5,634,220 A * 6/1997 Chiu ..................... E03C 1/0404 137/801

(Continued)

FOREIGN PATENT DOCUMENTS

CN 2447055 9/2001
CN 1651152 8/2005

(Continued)

*Primary Examiner* — Len Tran
*Assistant Examiner* — Alexander Valvis
(74) *Attorney, Agent, or Firm* — Rabin & Berdo, P.C.

(57) ABSTRACT

A ball arm switching shower has a fixed unit and a switching mechanism. The fixed unit is provided with multiple outlet functions, a assembling slot and a water inlet passage, each outlet function is provided with a water division hole. The switching mechanism comprises a connecting part, a handle, a switching plate, a transmission shaft and a sealing piece. The connecting part can be mounted in the assembling slot in a sliding and swinging manner. The handle is fixedly connected to the connecting part. The transmission shaft can fixedly connect to the connecting part and the switching plate, so that the switching plate can be driven to swing and slide through the movement of the handle.

20 Claims, 14 Drawing Sheets

(51) Int. Cl.

| | |
|---|---|
| ***F16K 21/00*** | (2006.01) |
| ***A62C 31/00*** | (2006.01) |
| ***F16K 31/12*** | (2006.01) |
| ***F16K 35/00*** | (2006.01) |
| ***F16K 31/44*** | (2006.01) |
| ***F16K 31/00*** | (2006.01) |
| ***B05B 1/18*** | (2006.01) |
| ***B05B 1/16*** | (2006.01) |

(56) References Cited

U.S. PATENT DOCUMENTS

| | | | | |
|---|---|---|---|---|
| 5,755,261 | A * | 5/1998 | Fukuzawa | C08L 71/00 137/625.17 |
| 5,823,510 | A * | 10/1998 | Muramatsu et al. | 251/368 |
| 5,937,905 | A * | 8/1999 | Santos | 137/871 |
| 6,357,950 | B1 * | 3/2002 | Chih | 401/289 |
| 6,920,899 | B2 * | 7/2005 | Haenlein et al. | 137/636.3 |
| 6,935,375 | B2 * | 8/2005 | Blessing | B05B 1/1609 137/636 |
| 7,798,369 | B2 * | 9/2010 | Ophardt | 222/180 |
| 2007/0193640 | A1 * | 8/2007 | Malek | 137/801 |

FOREIGN PATENT DOCUMENTS

| | | | | |
|---|---|---|---|---|
| CN | 1660504 | | 8/2005 | |
| CN | 1864866 | * | 11/2006 | B05B 1/32 |
| CN | 201026468 | | 2/2008 | |
| CN | 201324681 | | 10/2009 | |
| CN | 201644257 | | 11/2010 | |
| CN | 101954319 | | 1/2011 | |
| DE | 3002461 | A1 | 7/1981 | |
| DE | 2020050 16623 | U1 | 3/2006 | |

* cited by examiner

BALL ARM SWITCHING SHOWER

FIELD OF THE INVENTION

The present invention relates to a shower, more particularly to a ball arm switching shower.

BACKGROUND OF THE INVENTION

The switching shower usually comprises a fixed unit and a switching mechanism, the fixed unit is provided with multiple outlet functions, each outlet function is provided with one water division hole. There are two kinds of traditional switching mechanism: the first kind is rotary switch, the switch of the water division holes is achieved through the relative rotation between the water division body of the switching mechanism and the fixed unit, and then the switch of outlet functions is achieved; the second kind is sliding switch, the switch of the water division holes is achieved through the relative sliding between the water division body of the switching mechanism and the fixed unit, and then the switch of outlet functions is achieved. Because the switch of the two traditional switching mechanisms must be operated by two hands, it is inconvenient to operate when two hands is stained with bubbles during shower.

SUMMARY OF THE INVENTION

The object of the present invention is to offer a ball arm switching shower which overcomes the defect of inconvenient operation in the switching shower at the prior art.

The technical proposal used for solving the technical matter in the present invention is:

A ball arm switching shower comprises:

A fixed unit, which is provided with multiple outlet functions, a assembling slot and a water inlet passage, each outlet function is provided with a corresponding water division hole; and A switching mechanism, it comprises:

A connecting part, which can be mounted in the assembling slot in a sliding and swinging manner;

A handle, which is fixedly connected to the connecting part and extends out of the fixed unit for user's control;

A switching plate, which is mounted in the fixed unit and forms a fixed connection relationship with the connecting part; and Sealing pieces, of which the number is equal to that of water division holes, and each sealing piece is corresponding to each water division hole;

Wherein, the sealing pieces can be controlled to open or close the water division holes through the relative swing and slide between the switching plate and the fixed unit, so that the switching communication of the water division hole and the water inlet passage is achieved.

In a preferred embodiment, the switching mechanism also comprises: a transmission shaft, one end of which is fixedly connected to the connecting part, another end of which is fixedly connected to the switching plate, so that the switching plate can be driven to swing and slide through the movement of the handle.

In a preferred embodiment, four outlet functions are present; the fixed unit also comprises a screens board with a cross straight slot adaptive to the handle, the opening of the assembling slot is fixedly covered by the screens board.

In a preferred embodiment, the back of the connecting part is arranged to be an arc-shaped surface with four first locating slot arranged in cross form, and the handle is fixedly connected to the front of the connecting part;

A concave slot is arranged on the bottom surface of the assembling slot, in which a first spring and a locating pin that the first spring is against are arranged, and the locating pin is adaptive to the first locating slot.

In a preferred embodiment, a second locating slot is opened at the back of the connecting part, which is located among the four first locating slot and adaptive to the locating pin.

In a preferred embodiment,

The four sealing pieces comprise two first sealing pieces and two second sealing pieces;

The first sealing piece is Z-shaped and comprises a first sealing part, a first control part and a middle part which is fixedly connected to the first sealing part and the first control part, a second spring is arranged between the back of the first sealing part and the fixed unit, the first sealing part seals the water division hole in normally closed state with the action of the elastic force of the second spring;

The switching plate is provided with two first touching ends, the two first touching ends are corresponding to the fronts of the two first control parts, so that the first touching end can be against the first control part to lift the first sealing part up when the switching plate is swinging.

In a preferred embodiment,

The four sealing pieces comprise two first sealing pieces and two second sealing pieces;

The second sealing piece comprises a second sealing part and a second control part fixedly arranged at the back of the second sealing part, a third spring is arranged between the back of the second sealing part and the fixed unit, the second sealing part seals the water division hole in normally closed state with the action of the elastic force of the third spring;

The switching plate is provided with two second touching ends, the two second touching ends are arranged between two second control parts, so that the second touching end can be against the second control part to lift the second sealing part up when the switching plate is sliding.

In a preferred embodiment, the four sealing pieces are arranged in a cross form.

In a preferred embodiment, the fixed unit comprises a body, a locating plate and a cover plate, and a fixing slot is concavely arranged at the back of the body, and the locating plate is mounted in the fixing slot, and the opening of the fixing slot is fixedly and hermetically covered by the cover plate, and the switching plate is arranged in the fixing slot.

In a preferred embodiment, the cross straight slot on the screens board is provided with up-down-sliding gears and left-right-swinging gears.

Compared with the technical proposal at the prior art, the benefits of the present invention are:

1 The switching plate is driven to swing and slide through the movement of the handle, the movement of the sealing piece is controlled to open or close the water division hole through switching the slide and the swing of the switching plate, so that the switching communication of the water division hole and the water inlet passage is achieved, therefore: a. one hand operation can be achieved with obvious gears feeling when switching, and the users are prevented from faulty operation, and the operation is convenient; b. the switching mechanism can switch four outlet functions with simple structure;

2 A cross straight slot is opened on the screens board, therefore: a. the opening of the assembling slot can be covered by the screens board and can locate the connecting part; b. the cross straight slot can ensure the operation accuracy of the handle; c. it can avoid that water comes out of two outlet functions simultaneously;

3 The locating pin is inserted in the first locating slot to achieve the maintaining of the switching state with simple structure and better switching hand feel;

4 When the switching plate is swinging, the first touching end is against the first control part, so that the first sealing piece inclines, the first sealing part is lifted up, and then the water division hole corresponding with the first sealing piece is communicated with the water inlet passage, the structure is novel and simple;

5 When switching plate is sliding, the second touching end is against the second control part, so that the second sealing piece inclines, the second sealing part is lifted up, and then the water division hole corresponding with the second sealing piece is communicated with the water inlet passage, the structure is novel and simple.

DESCRIPTION OF THE PREFERRED EMBODIMENTS

Figure 1:
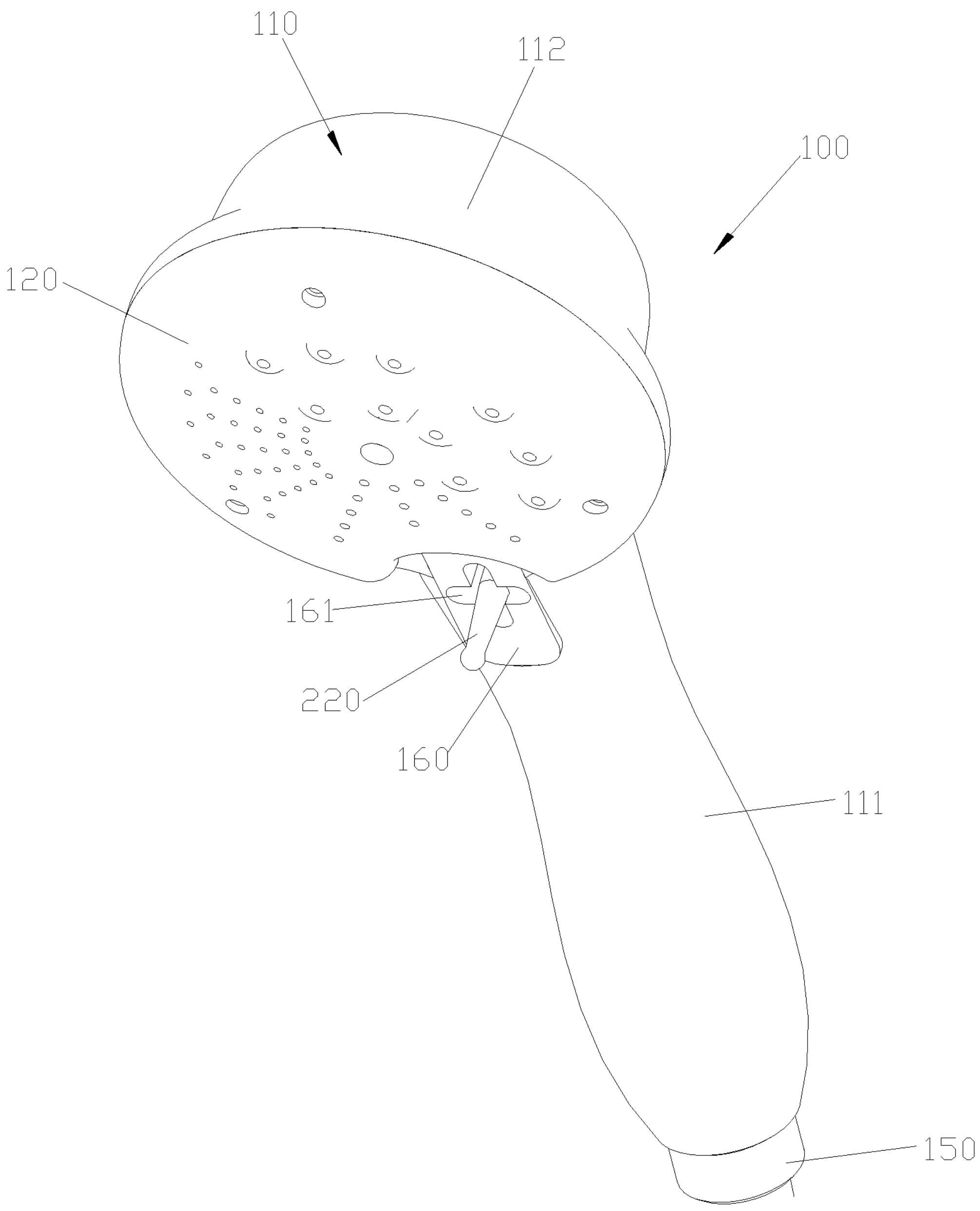
FIG. 1 shows the solid abridged general view of the shower in a preferred embodiment.
Figure 2:
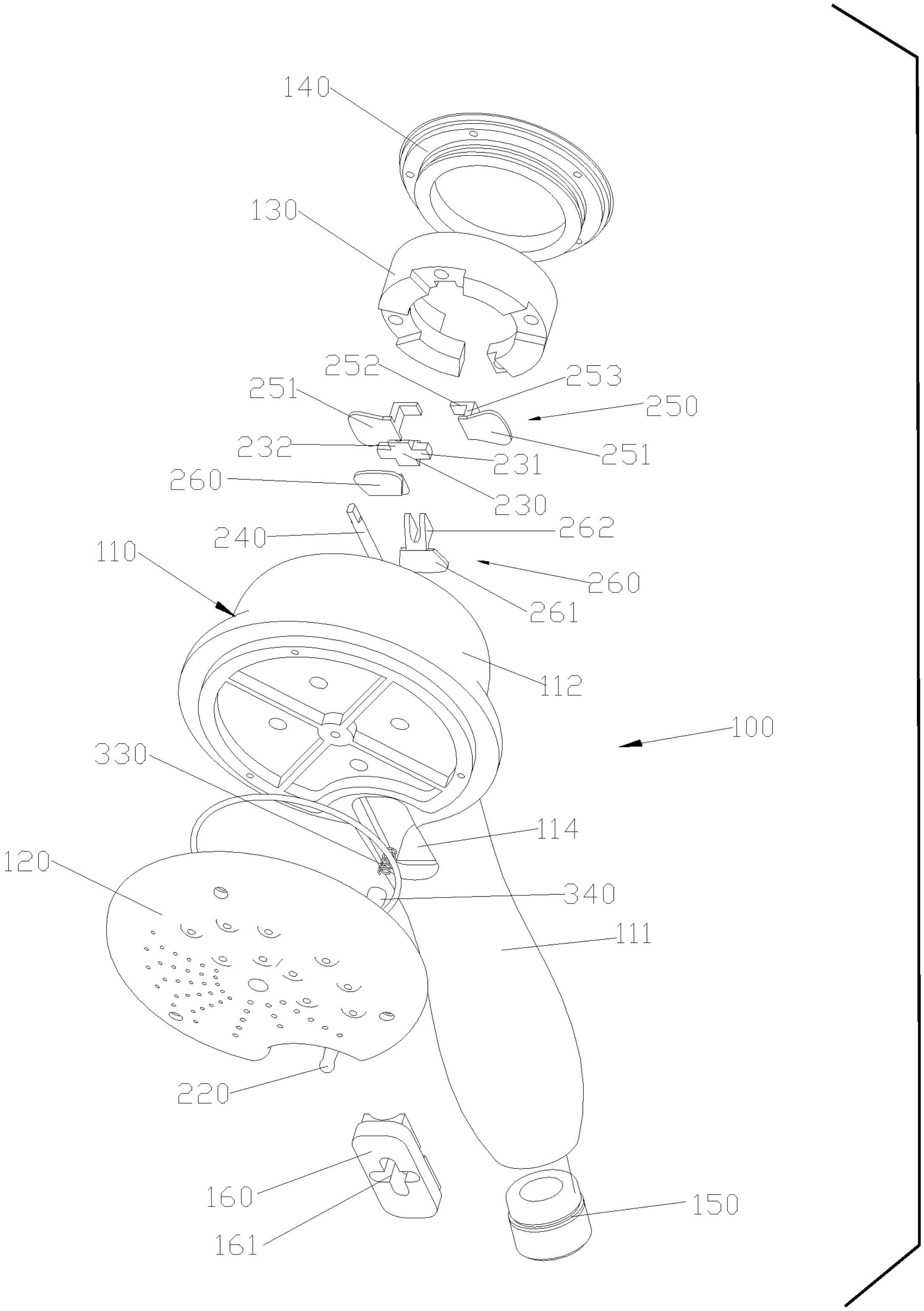
FIG. 2 shows the first solid exploded view of the shower in a preferred embodiment.
Figure 3:
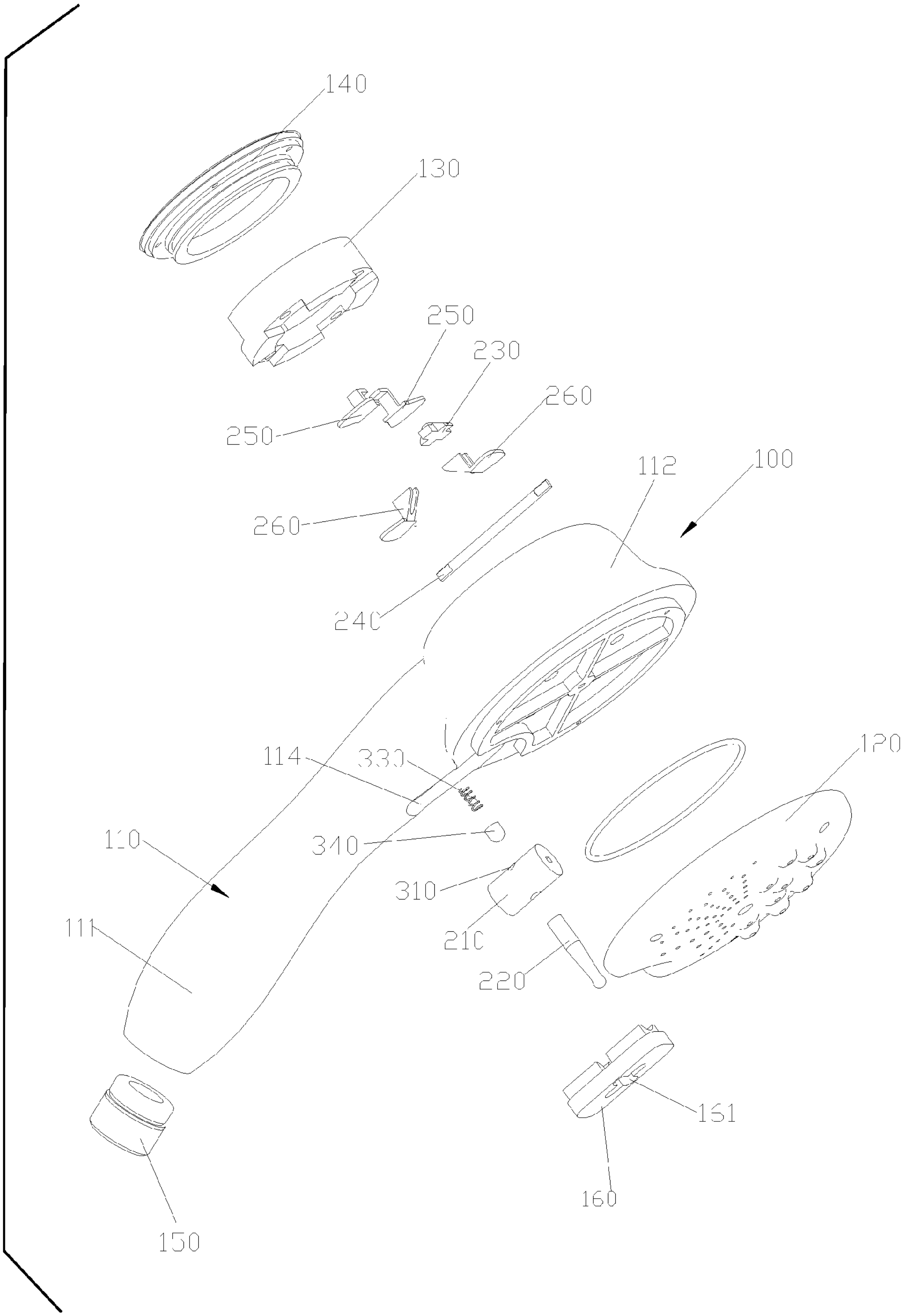
FIG. 3 shows the second solid exploded view of the shower in a preferred embodiment.
Figure 4:
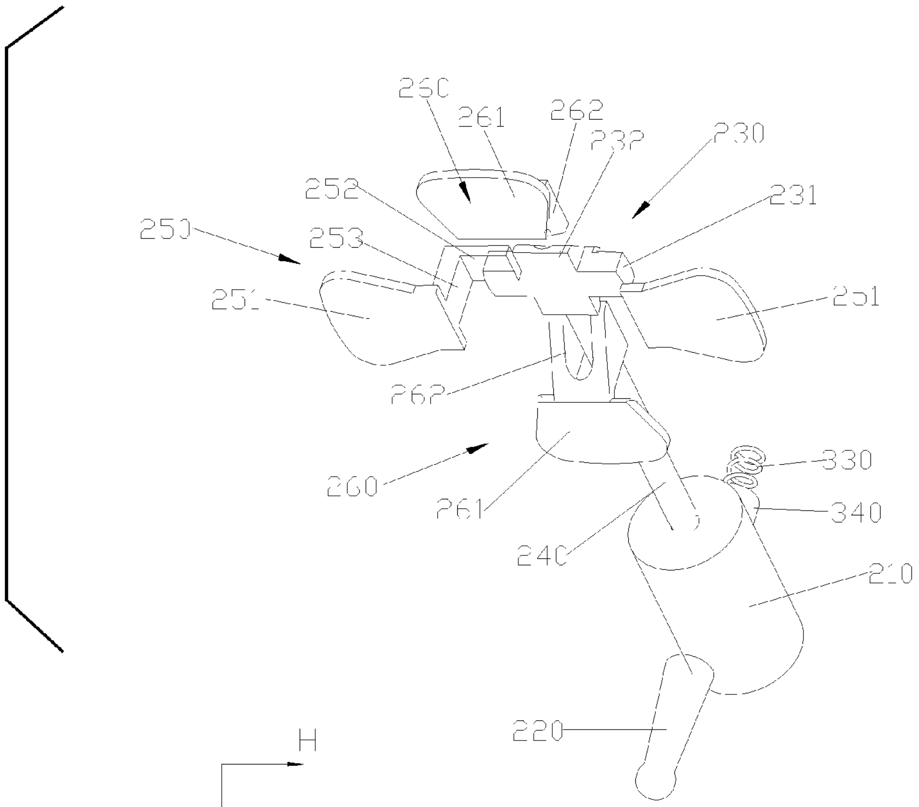
FIG. 4 shows the solid abridged general view of the switching mechanism of the shower in a preferred embodiment.
Figure 5:
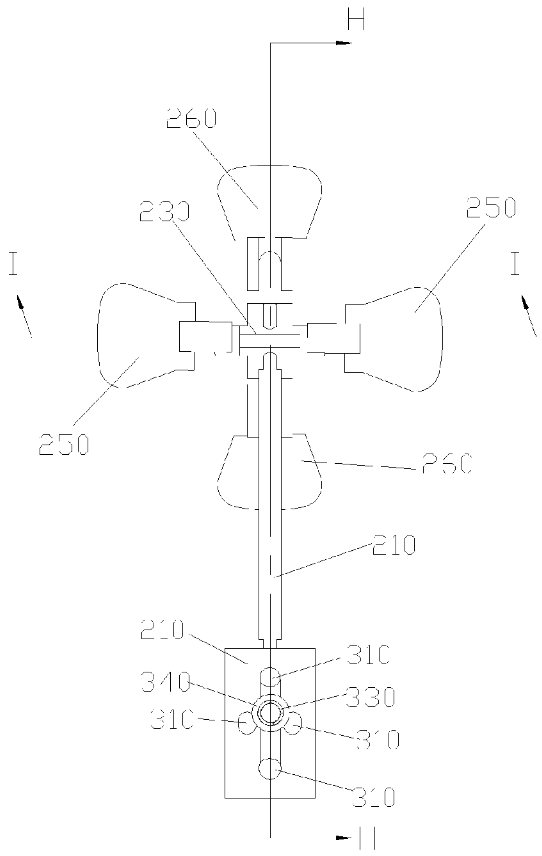
FIG. 5 shows the abridged general view of the switching mechanism of the shower in a preferred embodiment.
Figure 6:
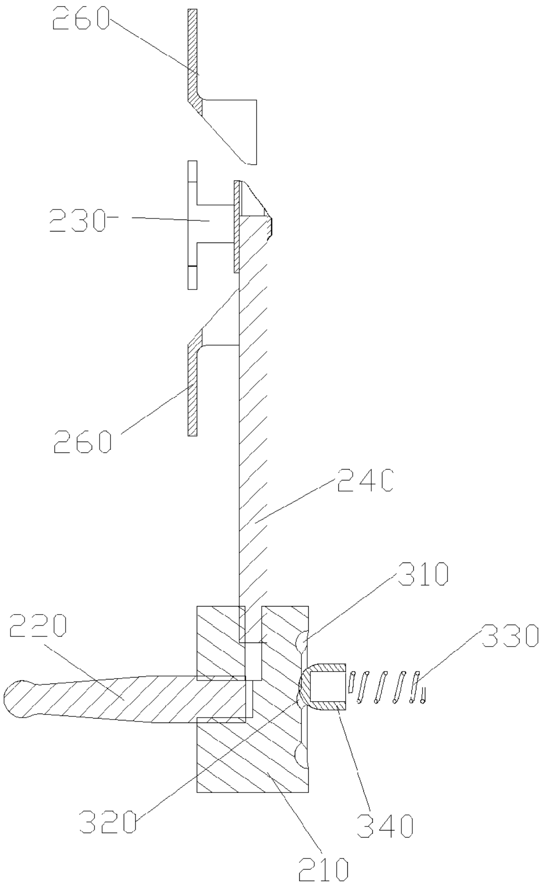
FIG. 6 shows the sectional view of FIG. 5 H-H.
Figure 7:
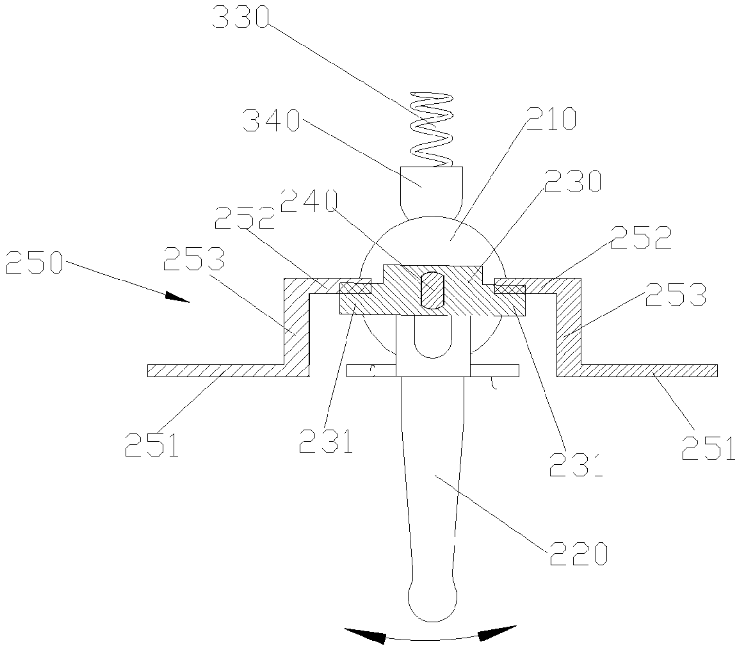
FIG. 7 shows the sectional view of FIG. 5 I-I.
Figure 8:
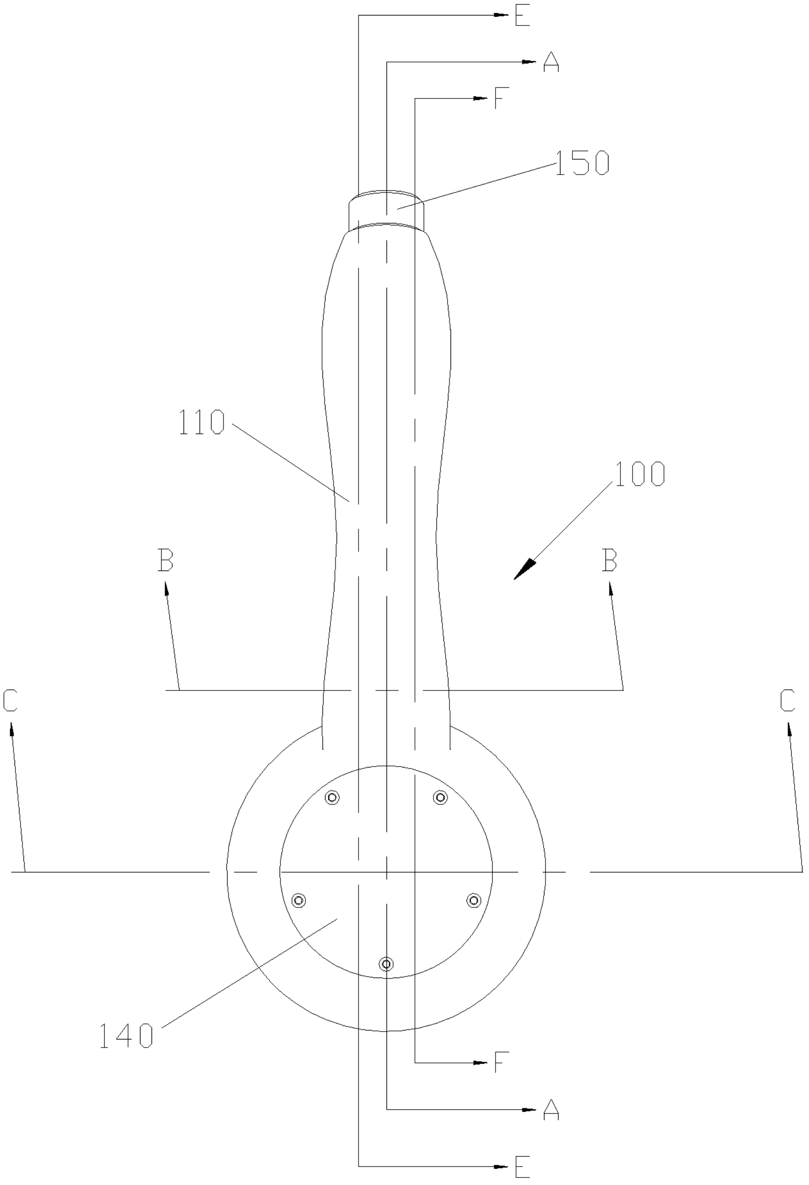
FIG. 8 shows the first abridged general view of the shower in a preferred embodiment.
Figure 9:
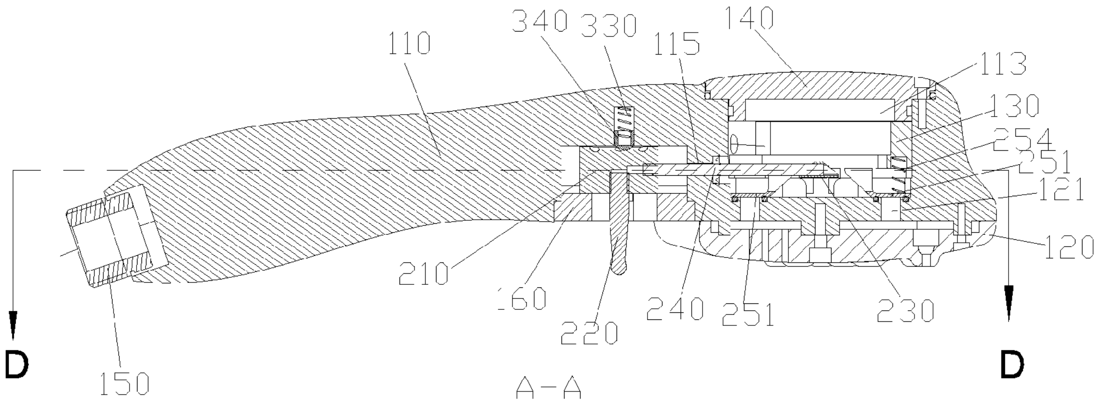
FIG. 9 shows the sectional view of FIG. 8 A-A.
Figure 10:
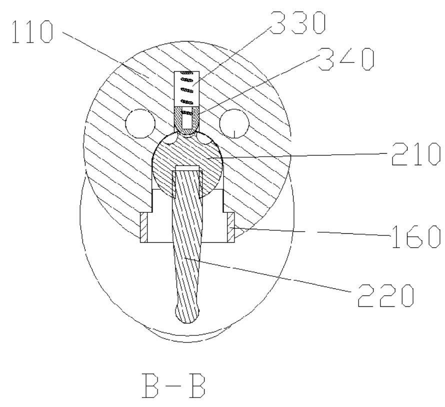
FIG. 10 shows the sectional view of FIG. 8 B-B.
Figure 11:
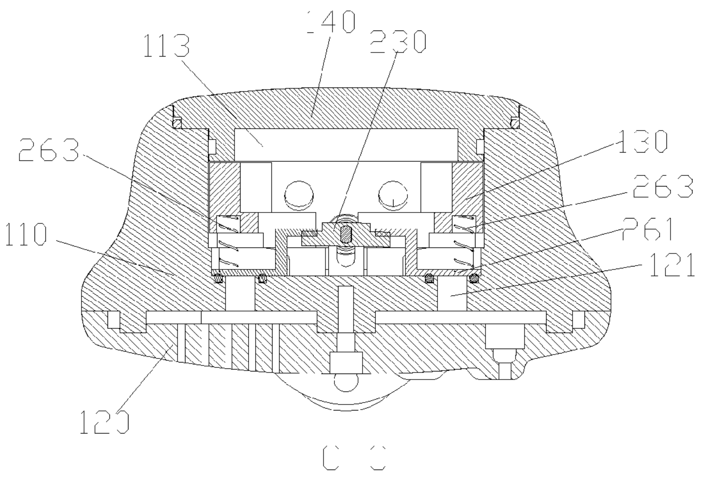
FIG. 11 shows the sectional view of FIG. 8 C-C.
Figure 12:
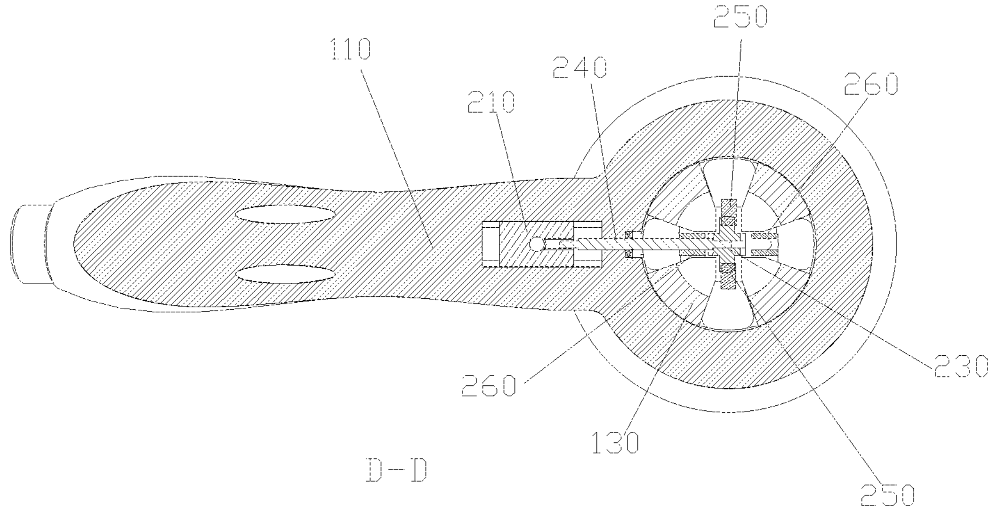
FIG. 12 shows the sectional view of FIG. 8 D-D.
Figure 13:
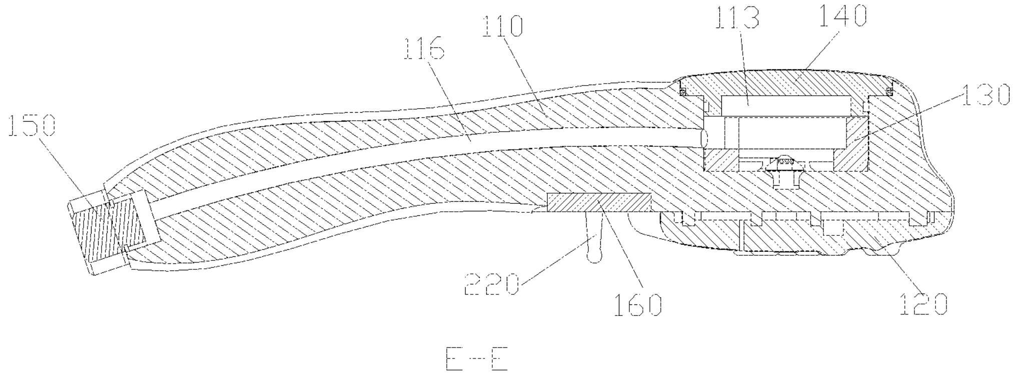
FIG. 13 shows the sectional view of FIG. 8 E-E.
Figure 14:
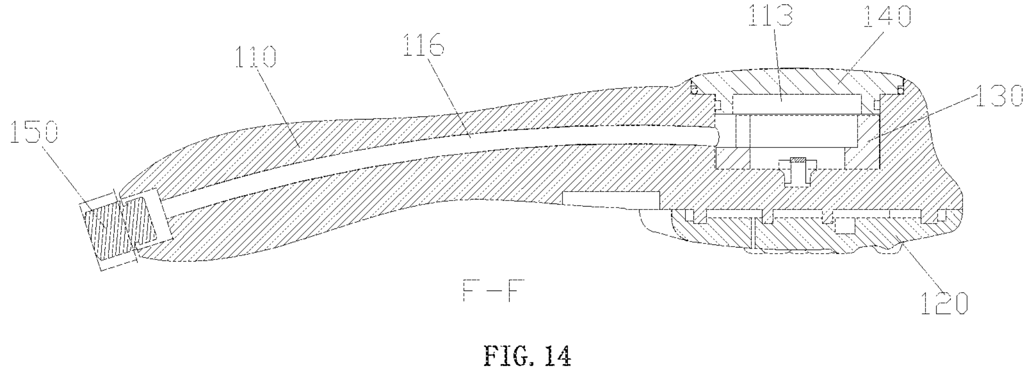
FIG. 14 shows the sectional view of FIG. 8 F-F.
Figure 15:
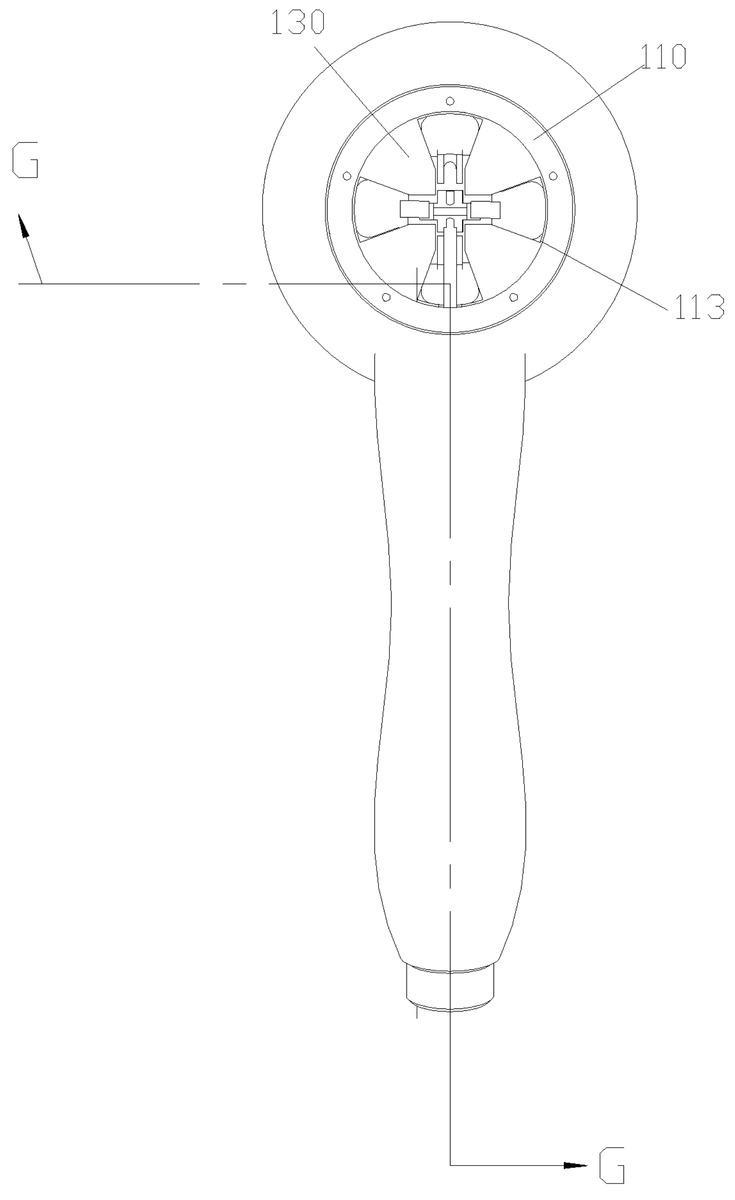
FIG. 15 shows the abridged general view of the shower in a preferred embodiment without the locating plate and the top cover.
Figure 16:
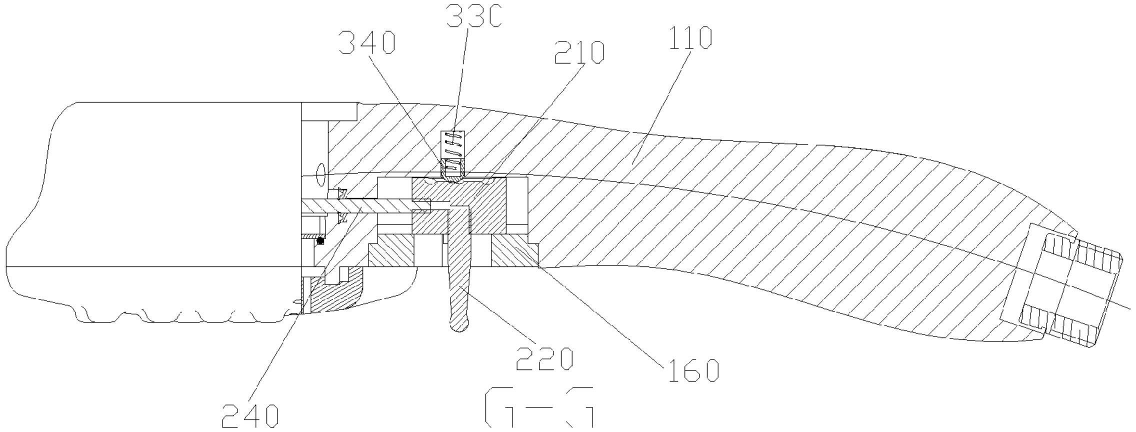
FIG. 16 shows the sectional view of FIG. 14 G-G.
Figure 17:
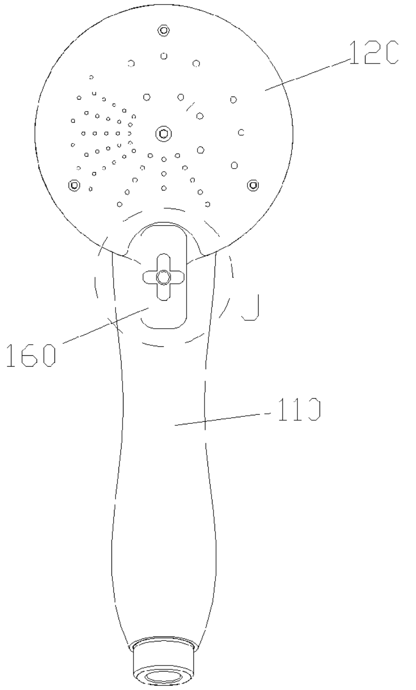
FIG. 17 shows the second abridged general view of the shower in a preferred embodiment.
Figure 18:
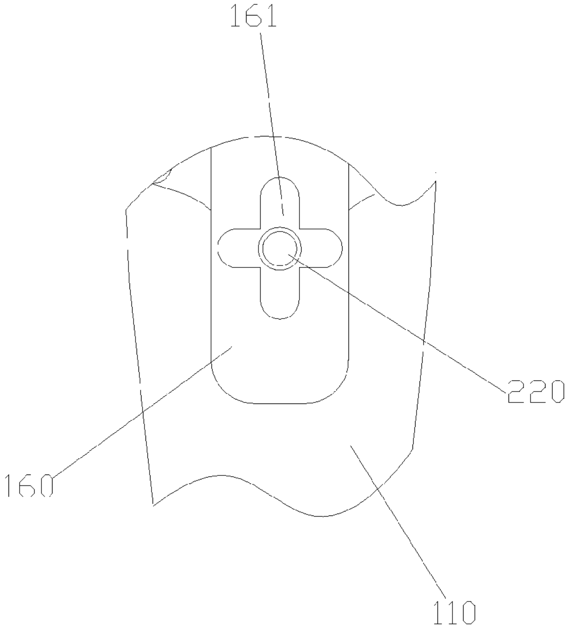
FIG. 18 shows the partial enlarged view of FIG. 17 J.

With the following description of the drawings and specific embodiments, the invention shall be further described in details.

According to FIG. 1 to FIG. 28, the ball arm switching shower comprises a fixed unit 100 and a switching mechanism.

According to FIG. 1 to FIG. 3, FIG. 8 to FIG. 16, the fixed unit 100 comprises a body 110, a face cover 120, a locating plate 130, a top cover 140, a plug 150 and a screens board 160.

The body 110 is provided with a handheld part 111 and a solid joint head 112 fixedly connected to the handheld part 111. A fixing slot 113 is concavely arranged at the back of the solid joint head 112, and an assembling slot 114 is concavely arranged on the front of the body 110, and a communicating slot 115 communicating the fixing slot 113 with the assembling slot 114 is also arranged in the body 110, and the bottom surface of the assembling slot 114 is a cambered surface. A water inlet passage 116 is also opened in the body 110, the inner end of the water inlet passage 116 is communicated with the fixing slot 113, and the outer end of the water inlet passage 116 is communicated with the outside water resource through the plug 150.

The face cover 120 is fixedly connected to the front of the body 110 with four outlet functions, each of which is provided with an outlet hole 121, and which are arranged on the bottom surface of the fixing slot 113 of the body 110 in a circular array.

The locating plate is a cambered segment, and is fixedly mounted in the fixing slot 113 of the body 110, and the cambered gap of the locating plate 130 is aimed at the communicating slot 115, so that the transmission shaft 240 can pass through.

The opening of the fixing slot 113 of the body 110 is fixedly and hermetically covered by the top cover 140.

The opening of the assembling slot 114 is fixedly covered by the screens board 160, and a cross straight slot 161 is opened on the screens board 160 with up-down-sliding gears and left-right-swinging gears.

According to FIG. 4 to FIG. 7, FIG. 8 to FIG. 16, the switching mechanism comprises a connecting part 210, a handle 220, a switching plate 230, a transmission shaft 240, two first sealing pieces 250 and two second sealing pieces 260.

The back of the connecting part 210 is arranged to be an arc-shaped surface, and is adaptively mounted in the assembling slot 114 of the body 110, so that the connecting part 210 can slide and swing relative to the assembling slot 114, the body 110 and the fixed unit 100.

The inner end of the handle 220 is fixedly connected to the front of the connecting part 210, the outer end passes through the cross straight slot 161 of the screens board 160 and extends out of the fixed unit 100, so that the users can control, and the outer end of the handle 220 is a spherical body.

One end of the transmission shaft 240 is fixedly connected to the connecting part 210, the other end passes through the communicating slot 115 and is fixedly connected to the switching plate 230, and the switching plate 230 can be driven to slide and swing through the movement of the handle 220.

The first sealing piece 250 is Z-shaped and comprises a first sealing part 251, a first control part 252 and a middle part 253 by which the first sealing part 251 and the first control part 252 are fixedly connected, a second spring 254 is arranged between the back of the first sealing part 251 and the locating plate 130 of the fixed unit 100, the first sealing part 251 seals the corresponding water division hole 121 in normally closed state with the action of the elastic force of the second spring 254.

The second sealing piece 260 comprises a second sealing part 261, and a second control part 262 fixedly connected to the back of the second sealing part 261, a third spring 263 is arranged between the back of the second sealing part 261 and the locating plate 130 of the fixed unit 100, the second sealing part 261 seals the corresponding water division hole 121 in normally closed state with the action of the elastic force of the third spring 263.

Two first touching ends 231 and two second touching ends 232 are convexly arranged on the switching plate 230, the two first touching ends 231 and the two touching ends 232 are arranged to be a cross. And the switching plate 230 is mounted in the fixing slot 113 of the body 110.

The two first touching ends 231 are arranged between two first sealing pieces 250, and corresponding to the fronts of the two first control part 250, so that the first touching end 231 can be against the first control part 252 when the switching plate 230 is swinging to move the first sealing piece 250, and to lift the first sealing part 251 up, and to compress the second spring 254 to store energy, and to open the water division hole 121 corresponding to the first sealing piece 250, and then the fixing slot 113 is communicated, and the water inlet passage is communicated, and the outside water resource is communicated; of course, when the switching plate is reversed, the second spring 254 is loosen, and the first sealing piece 250 is moved and the first sealing part 251 goes back to block the water division hole with the action of the elastic force of the second spring 254.

Tow second touching ends 232 are arranged between two second sealing pieces 260, and corresponding to gap between the two second control part 262, so that the second touching end 232 can be against the second control part 262 when the switching plate 230 is sliding to move the second sealing piece 260, and to lift the second sealing part 261 up, and to compress the third spring 263 to store energy, and to open the water division hole 121 corresponding to the second sealing piece 260, and then the fixing slot 113 is communicated, and the water inlet passage is communicated, and the outside water resource is communicated; of course, when the switching plate is reversed, the third spring 263 is loosen, and the second sealing piece 260 is moved and the second sealing part 261 goes back to block the water division hole with the action of the elastic force of the third spring 263.

Four first locating slots 310 and a second locating 320 are opened on the back of the connecting part 210, four first locating slots are arranged to be a cross, the second locating slot 320 is arranged among four first locating slots 310. A concave slot is arranged on the bottom surface of the assembling slot 114, a first spring 330 and a locating pin 340 that the first spring 330 is against are arranged in the concave slot, and the locating pin 340 is adaptive to the first locating slots 310 and the second locating slot 320, the maintaining of the switching state is achieved through the cooperation of the locating pin 340 and the locating slots with better hand feel and better locating stability of the connecting part.

For better understanding the present invention, the switching principle of the shower is introduced below in details. For clearer understanding, the two first sealing pieces are defined as the left first sealing piece and the right first sealing piece respectively, and the left first control part, the left first sealing part, the left second spring, the right first control part, the right first sealing part and the right second spring are correspondingly defined; the two second sealing pieces are defined as the upper second sealing piece and the lower second sealing piece respectively, and the upper first control part, the upper first sealing part, the upper third spring, the lower first control part, the lower first sealing part and the lower third spring are correspondingly defined; the two second touching ends are defined as the left first touching end and the right first touching end; the two second touching ends are defined as the upper second touching end and the lower second touching end; the four water division holes are defined as the left water division hole, the right water division hole, the upper water division hole and the lower water division hole.

At original state, all four water division holes 121 are sealed by the two first sealing pieces 250 and the two second sealing pieces 260, at water stop state, and as shown in FIG. 8 to FIG. 18, the locating pin 340 is adaptively inserted into the second locating slot 320 at this moment.

Figure 19:
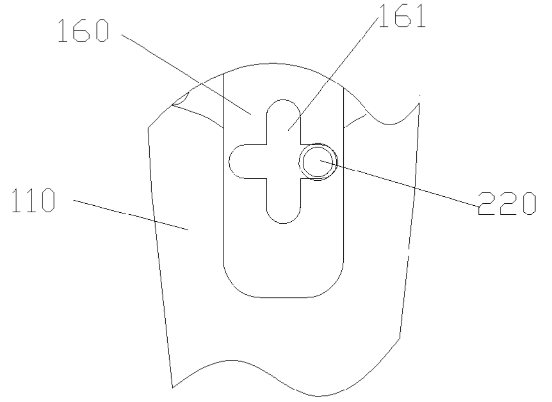
FIG. 19 shows the partial enlarged view of FIG. 17 J, and water comes out of the first outlet function at this moment.
Figure 20:
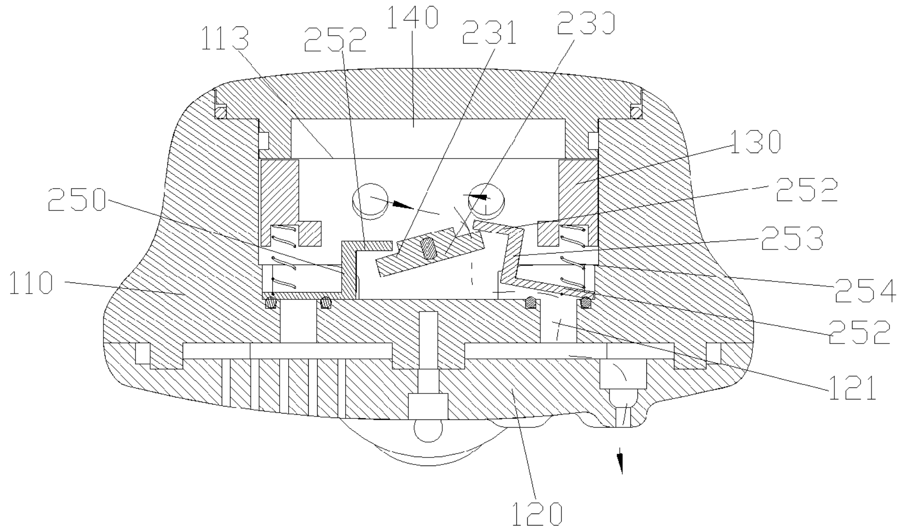
FIG. 20 shows the sectional view of FIG. 8 C-C, and water comes out of the first outlet function at this moment.
Figure 21:
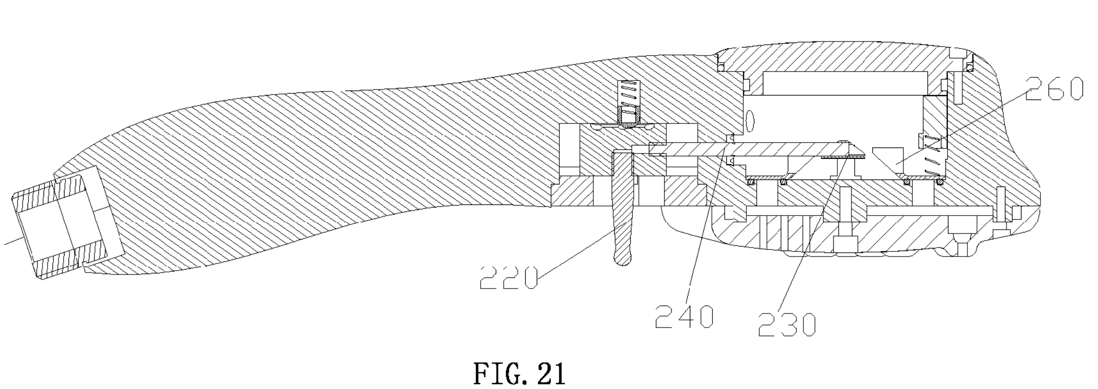
FIG. 21 shows the sectional view of FIG. 8 A-A, and water comes out of the first outlet function at this moment.

As shown in FIG. 19 to FIG. 21, the handle 220 is swayed to right by the users, the handle 220 swings to the lateral right side of the cross slot 161, and the connecting part 210 swings to right, and at this moment, the locating pin 340 is inserted into the first locating slot 310 that is at right side; the switching plate 230 is driven to rotate to right side through the transmission shaft 240, and the right first touching end 231 is rotated anticlockwise and against the right first sealing piece 250, so that the right first sealing part 251 is lifted up, and the right water division hole 121 is communicated, and water comes out of the outlet function corresponding to the right water division hole 121, and the right second spring 254 is compressed and stores energy.

Figure 22:
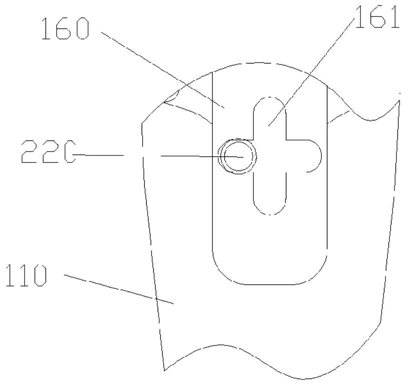
FIG. 22 shows the partial enlarged view of FIG. 17 J, and water comes out of the second outlet function at this moment.
Figure 23:
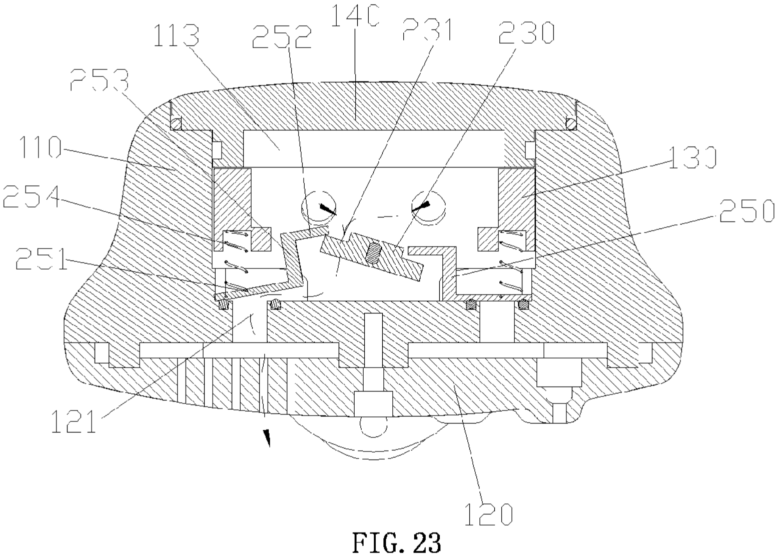
FIG. 23 shows the sectional view of FIG. 8 C-C, and water comes out of the second outlet function at this moment.

As shown in FIG. 22 to FIG. 23, the handle 220 is swayed to left by the users, the handle 220 swings to the lateral left side of the cross slot 161, and the connecting part 210 swings to left, and at this moment, the right first sealing part 251 goes back to seal the right water division hole 121 with the action of the elastic force of the right second spring 254; the locating pin 340 is inserted into the first locating slot 310 that is at left side; the switching plate 230 is driven to rotate to left side through the transmission shaft 240, and the left first touching end 231 is rotated clockwise and against the left first sealing piece 250, so that the left first sealing part 251 is lifted up, and the left water division hole 121 is communicated, and water comes out of the outlet function corresponding to the left water division hole 121, and the left second spring 254 is compressed and stores energy.

The handle 220 is at original position, and at this moment, the left first sealing part 251 goes back to seal the left water division hole 121 with the action of the elastic force of the left second spring 254.

Figure 24:
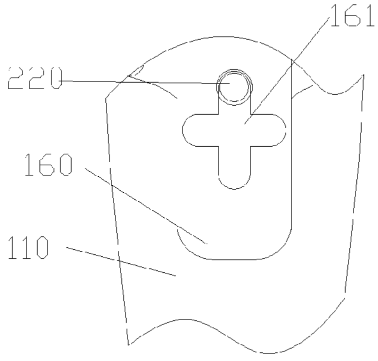
FIG. 24 shows the partial enlarged view of FIG. 17 J, and water comes out of the third outlet function at this moment.
Figure 25:
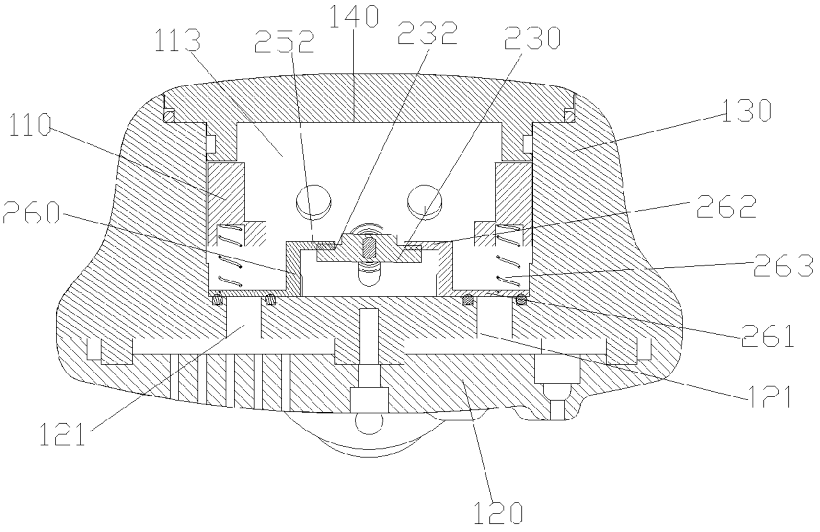
FIG. 25 shows the sectional view of FIG. 8 C-C, and water comes out of the third outlet function at this moment.
Figure 26:
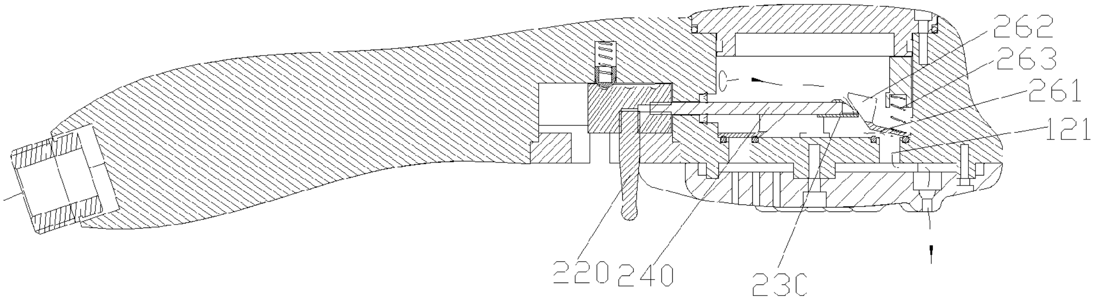
FIG. 26 shows the sectional view of FIG. 8 A-A, and water comes out of the third outlet function at this moment.

As shown in FIG. 24 to FIG. 26, the handle 220 is slide upward, and the connecting part 210 is slide upward, and at this moment, the locating pin 340 is inserted into the first locating slot 310 that is at up side; the switching plate 230 is driven to slide upward through the transmission shaft 240, and the upper second touching end 232 is slide upward and against the upper second sealing piece 260, so that the upper second sealing piece 260 is moved and the upper second sealing part 261 is lifted up, and the upper water division hole 121 is communicated, and water comes out of the outlet function corresponding to the upper water division hole 121, and the upper third spring 263 is compressed and stores energy.

Figure 27:
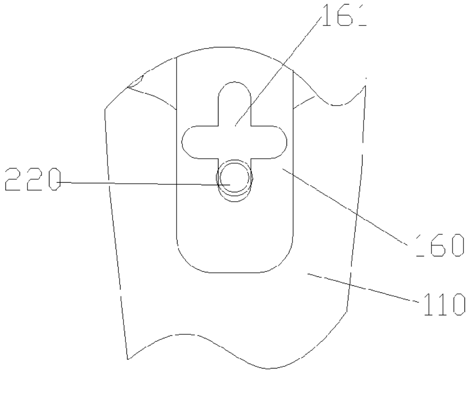
FIG. 27 shows the partial enlarged view of FIG. 17 J, and water comes out of the forth outlet function at this moment.
Figure 28:
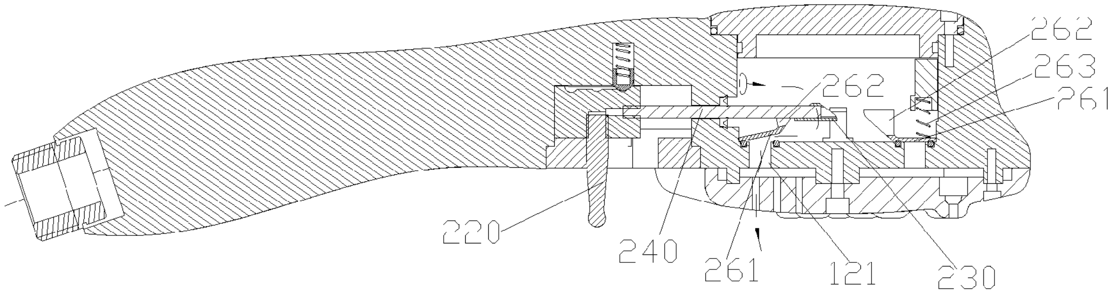
FIG. 28 shows the sectional view of FIG. 8 A-A, and water comes out of the forth outlet function at this moment.

As shown in FIG. 27 to FIG. 28, the handle 220 is slide downward, and the connecting part 210 is slide downward, and at this moment, the locating pin 340 is inserted into the first locating slot 310 that is at down side; the switching plate 230 is driven to slide downward through the transmission shaft 240; and at this moment, the lower second touching end 232 is slide downward and against the lower second sealing piece 260, so that the lower second sealing piece 260 is moved and the lower second sealing part 261 is lifted up, and the lower water division hole 121 is communicated, and water comes out of the outlet function corresponding to the lower water division hole 121, and the lower third spring 263 is compressed and stores energy.

According to the description above, in the present embodiment, the switch of four outlet functions can be achieved with five states which are four outlet functions and one water stop.

The invention has been described with reference to the preferred embodiments mentioned above; therefore it cannot limit the reference implementation of the invention. It is obvious to a person skilled in the art that structural modification and changes can be carried out without leaving the scope of the claims hereinafter and the description above.

INDUSTRIAL APPLICABILITY

The ball arm switching shower in the present invention, the switching plate is driven to swing and slide through the movement of the handle, the sealing piece is controlled to open or close the water division hole through the sliding and the swinging of the switching plate, so that the switching communication of the water division hole and the water inlet passage is achieved with one hand operation and with obvious gears feeling when switching.

What is claimed is:

1. A ball arm switching shower, comprising:
- a fixed unit, which is provided with multiple outlet functions, an assembling slot and a water inlet passage, each outlet function is provided with a corresponding water division hole; and
- a switching mechanism, including:
- a connecting part, which can be mounted in the assembling slot in a sliding and swinging manner;
- a handle, which is fixedly connected to the connecting part and extends out of the fixed unit for user's control;
- a switching plate, which is mounted in the fixed unit and forms a fixed connection relationship with the connecting part; and
- a plurality of sealing parts, of which the number is equal to that of water division holes, and each sealing piece is corresponding to each water division hole;
- wherein actuation of the handle to swing and to slide moves the plurality of sealing parts simultaneously with the connecting part to open or close their corresponding said water division holes so that a switching communication of the water division holes and the water inlet passage is achieved.

2. A ball arm switching shower according to claim 1, wherein, the switching mechanism also comprises: a transmission shaft, one end of which is fixedly connected to the connecting part, another end of which is fixedly connected to the switching plate, so that the switching plate can be driven to swing and slide through the movement of the handle.

3. A ball arm switching shower according to claim 1, wherein,
- four outlet functions are present;
- the fixed unit also comprises a screen board with a cross straight slot adaptive to the handle,
- the opening of the assembling slot is fixedly covered by the screens board.

4. A ball arm switching shower, comprising:
- a fixed unit, which is provided with multiple outlet functions, an assembling slot and a water inlet passage, each outlet function is provided with a corresponding water division hole; and
- a switching mechanism, including:
- a connecting part, which can be mounted in the assembling slot in a sliding and swinging manner;
- a handle, which is fixedly connected to the connecting part and extends out of the fixed unit for user's control;
- a switching plate, which is mounted in the fixed unit and forms a fixed connection relationship with the connecting part; and
- a plurality of sealing parts, of which the number is equal to that of water division holes, and each sealing piece is corresponding to each water division hole;
- wherein actuation of the handle to swing and to slide moves the plurality of sealing parts simultaneously with the connecting part to open or close their corresponding said water division holes so that a switching communication of the water division holes and the water inlet passage is achieved,
- four outlet functions are present;
- the fixed unit also comprises a screen board with a cross straight slot adaptive to the handle,
- the opening of the assembling slot is fixedly covered by the screens board,
- wherein, the back of the connecting part is arranged to be an arc-shaped surface with four first locating slots arranged in cross form,
- the handle is fixedly connected to the front of the connecting part;
- a concave slot is arranged on the bottom surface of the assembling slot, in which a first spring and a locating pin that the first spring is against are arranged, and
- the locating pin is adaptive to the first locating slot.

5. A ball arm switching shower according to claim 4, wherein, a second locating slot is opened at the back of the connecting part, which is located among the four first locating slot and adaptive to the locating pin.

6. A ball arm switching shower according to claim 3, wherein,
- wherein the plurality of sealing parts comprises four sealing parts further comprising two first sealing pieces and two second sealing pieces;
- the first sealing piece is Z-shaped and comprises a first sealing part, a first control part and a middle part which is fixedly connected to the first sealing part and the first control part,
- a second spring is arranged between the back of the first sealing part and the fixed unit,
- the first sealing part seals the water division hole in normally closed state with the action of the elastic force of the second spring;
- the switching plate is provided with two first touching ends,
- the two first touching ends are corresponding to the fronts of the two first control parts, so that the first touching end can be against the first control part to lift the first sealing part up when the switching plate is swinging.

7. A ball arm switching shower according to claim 3, wherein,
- wherein the plurality of sealing parts comprises four sealing parts further comprising two first sealing pieces and two second sealing pieces;

the second sealing piece comprises a second sealing part and a second control part fixedly arranged at the back of the second sealing part, a third spring is arranged between the back of the second sealing part and the fixed unit, the second sealing part seals the water division hole in normally closed state with the action of the elastic force of the third spring;

the switching plate is provided with two second touching ends, the two second touching ends are arranged between two second control parts, so that the second touching end can be against the second control part to lift the second sealing part up when the switching plate is sliding.

8. A ball arm switching shower according to claim 3, wherein, the four sealing pieces are arranged in a cross form.

9. A ball arm switching shower according to claim 3, wherein, the fixed unit comprises a body, a locating plate and a cover plate, a fixing slot is concavely arranged at the back of the body, the locating plate is mounted in the fixing slot, the opening of the fixing slot is fixedly and hermetically covered by the cover plate, and the switching plate is arranged in the fixing slot.

10. A ball arm switching shower according to claim 3, wherein, the cross straight slot on the screens board is provided with up-down-sliding gears and left-right-swinging gears.

11. A ball arm switching shower according to claim 4, wherein, wherein the plurality of sealing parts comprises four sealing parts further comprising two first sealing pieces and two second sealing pieces;

the first sealing piece is Z-shaped and comprises a first sealing part, a first control part and a middle part which is fixedly connected to the first sealing part and the first control part, a second spring is arranged between the back of the first sealing part and the fixed unit, the first sealing part seals the water division hole in normally closed state with the action of the elastic force of the second spring;

the switching plate is provided with two first touching ends, the two first touching ends are corresponding to the fronts of the two first control parts, so that the first touching end can be against the first control part to lift the first sealing part up when the switching plate is swinging.

12. A ball arm switching shower according to claim 5, wherein, wherein the plurality of sealing parts comprises four sealing parts further comprising two first sealing pieces and two second sealing pieces;

the first sealing piece is Z-shaped and comprises a first sealing part, a first control part and a middle part which is fixedly connected to the first sealing part and the first control part, a second spring is arranged between the back of the first sealing part and the fixed unit, the first sealing part seals the water division hole in normally closed state with the action of the elastic force of the second spring;

the switching plate is provided with two first touching ends, the two first touching ends are corresponding to the fronts of the two first control parts, so that the first touching end can be against the first control part to lift the first sealing part up when the switching plate is swinging.

13. A ball arm switching shower according to claim 4, wherein, wherein the plurality of sealing parts comprises four sealing parts further comprising two first sealing pieces and two second sealing pieces;

the second sealing piece comprises a second sealing part and a second control part fixedly arranged at the back of the second sealing part, a third spring is arranged between the back of the second sealing part and the fixed unit, the second sealing part seals the water division hole in normally closed state with the action of the elastic force of the third spring;

the switching plate is provided with two second touching ends, the two second touching ends are arranged between two second control parts, so that the second touching end can be against the second control part to lift the second sealing part up when the switching plate is sliding.

14. A ball arm switching shower according to claim 5, wherein, wherein the plurality of sealing parts comprises four sealing parts further comprising two first sealing pieces and two second sealing pieces;

the second sealing piece comprises a second sealing part and a second control part fixedly arranged at the back of the second sealing part, a third spring is arranged between the back of the second sealing part and the fixed unit, the second sealing part seals the water division hole in normally closed state with the action of the elastic force of the third spring;

the switching plate is provided with two second touching ends, the two second touching ends are arranged between two second control parts, so that the second touching end can be against the second control part to lift the second sealing part up when the switching plate is sliding.

15. A ball arm switching shower according to claim 4, wherein, the four sealing parts are arranged in a cross form.

16. A ball arm switching shower according to claim 5, wherein, the four sealing parts are arranged in a cross form.

17. A ball arm switching shower according to claim 4, wherein, the fixed unit comprises a body, a locating plate and a cover plate, a fixing slot is concavely arranged at the back of the body, the locating plate is mounted in the fixing slot, the opening of the fixing slot is fixedly and hermetically covered by the cover plate, and the switching plate is arranged in the fixing slot.

18. A ball arm switching shower according to claim 5, wherein, the fixed unit comprises a body, a locating plate and a cover plate, a fixing slot is concavely arranged at the back of the body, the locating plate is mounted in the fixing slot, the opening of the fixing slot is fixedly and hermetically covered by the cover plate, and the switching plate is arranged in the fixing slot.

19. A ball arm switching shower according to claim 4, wherein, the cross straight slot on the screens board is provided with up-down-sliding gears and left-right-swinging gears.

20. A ball arm switching shower according to claim 5, wherein, the cross straight slot on the screens board is provided with up-down-sliding gears and left-right-swinging gears.

* * * * *